Figure 1:
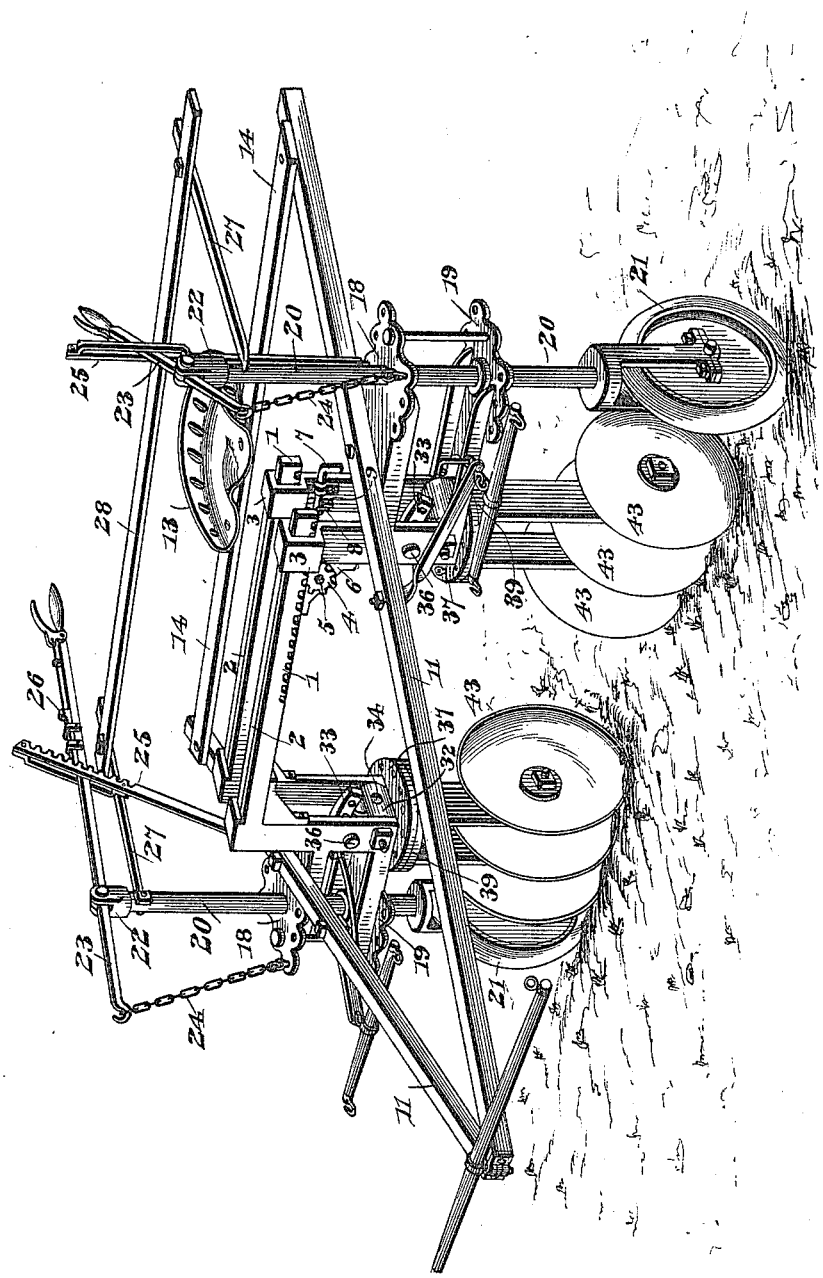

No. 616,991. Patented Jan. 3, 1899.
C. TANNER.
CULTIVATOR.
(Application filed Apr. 27, 1898.)
(No Model.) 3 Sheets—Sheet 1.

Witnesses
Jas. K. McCathran
U. B. Hillyard.

Charles Tanner Inventor
By his Attorneys,
C. A. Snow & Co.

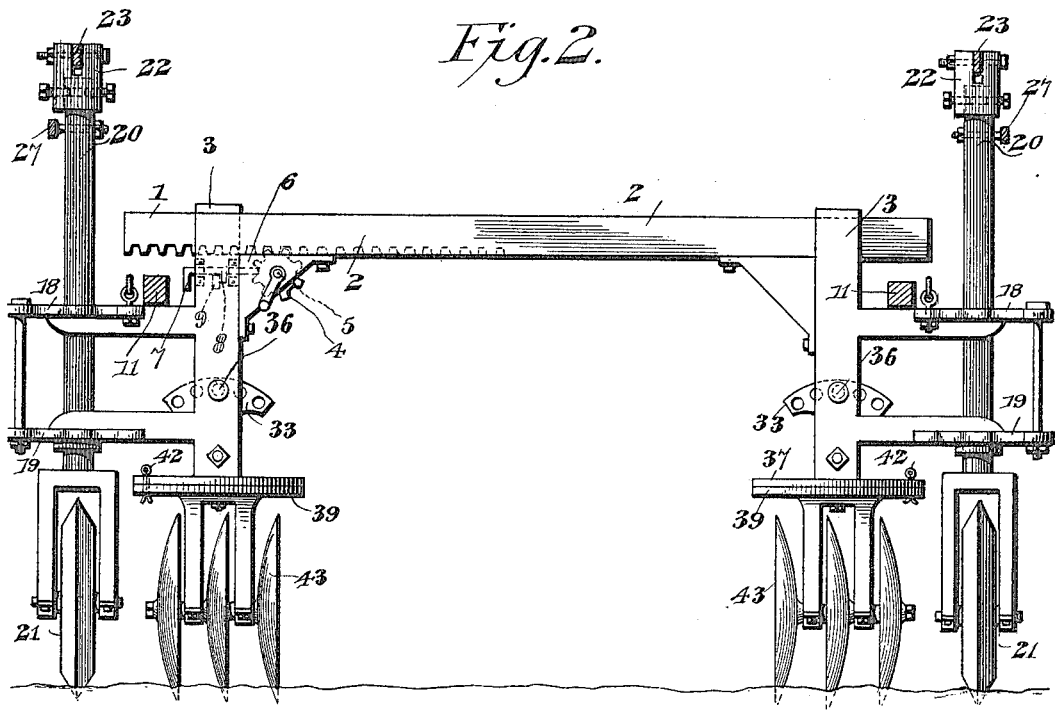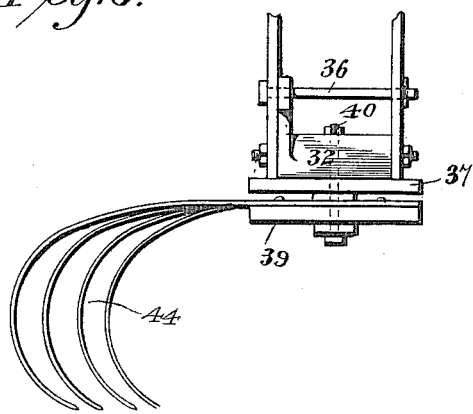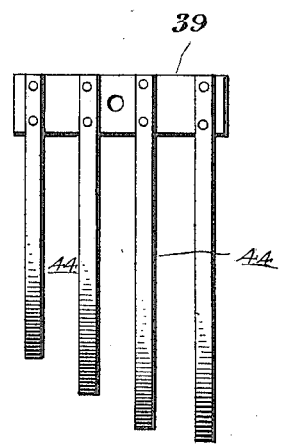

No. 616,991. Patented Jan. 3, 1899.
C. TANNER.
CULTIVATOR.
(Application filed Apr. 27, 1898.)
(No Model.) 3 Sheets—Sheet 3.
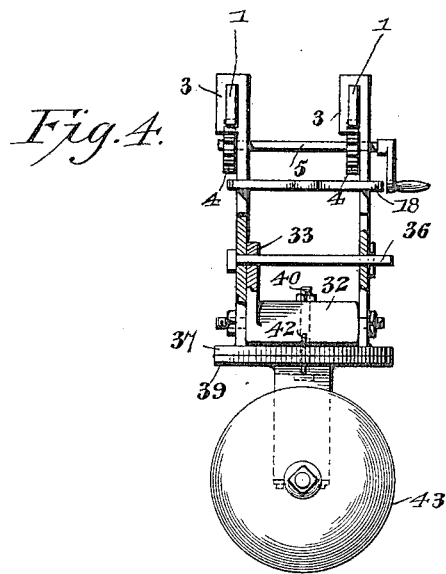
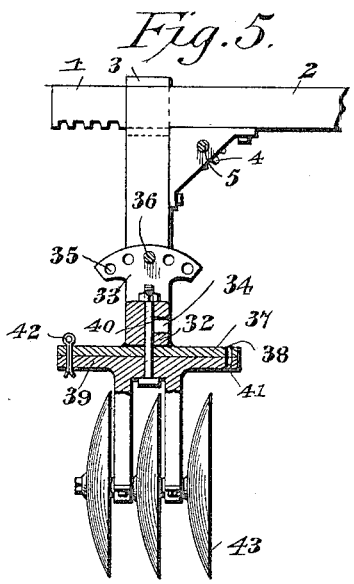
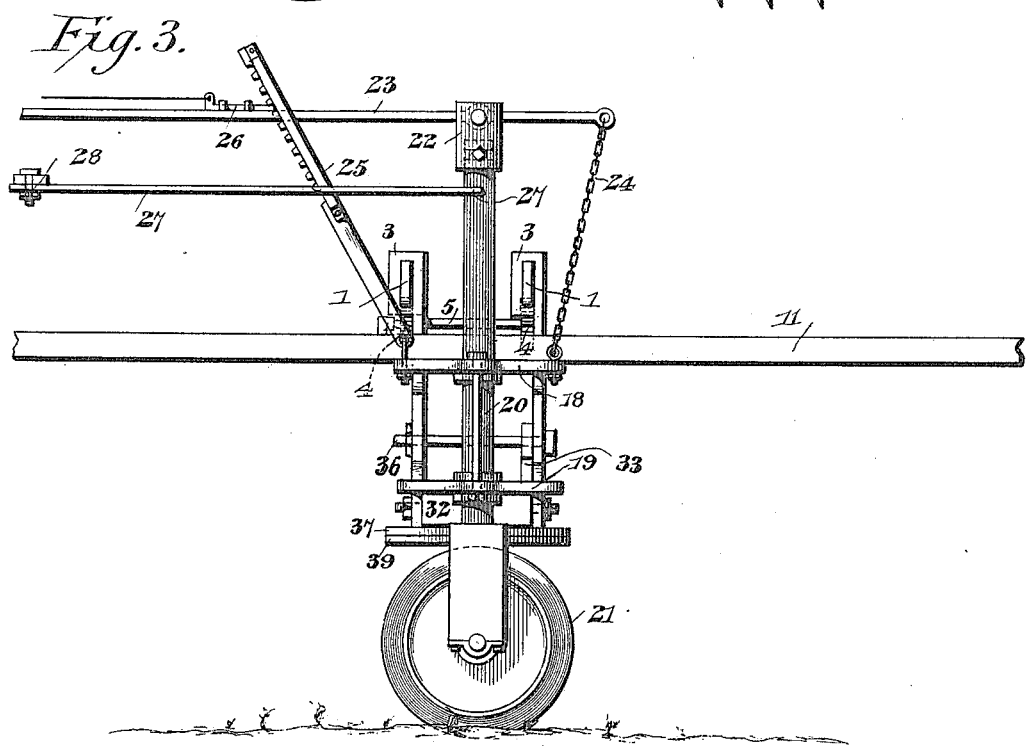
Witnesses
Jas. K. McCathran
V. B. Hillyard
Charles Tanner, Inventor
By his Attorneys,
C. A. Snow & Co.

UNITED STATES PATENT OFFICE.

CHARLES TANNER, OF CHENEYVILLE, LOUISIANA.

CULTIVATOR.

SPECIFICATION forming part of Letters Patent No. 616,991, dated January 3, 1899.

Application filed April 27, 1898. Serial No. 678,990. (No model.)

*To all whom it may concern:*

Be it known that I, CHARLES TANNER, a citizen of the United States, residing at Cheneyville, in the parish of Rapides and State of Louisiana, have invented a new and useful Cultivator, of which the following is a specification.

This invention relates to agricultural machinery for preparing and tilling the soil in order to secure good crops, the purpose of the improvement being to construct an implement of this type which can be easily varied in width, regulated as to height, and adjusted so as to throw the earth-treating devices at any desired angle with reference to the line of draft, whereby when cultivating the earth may be thrown toward or away from the plants in greater or less quantity.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of an implement embodying the principal features of this invention. Fig. 2 is a rear view. Fig. 3 is a side view, the front and rear portions being broken away. Fig. 4 is a detail view in elevation of the vertical ends of the arches, showing the means for connecting the earth-treating devices thereto. Fig. 5 is a front view of the parts illustrated in Fig. 4. Fig. 6 is a detail view of a harrow attachment, showing its connection with the frame. Fig. 7 is a top plan view of a harrow attachment.

Corresponding and like parts are referred to in the following description and indicated in the several views of the drawings by the same reference characters.

The framework comprises front and rear arches disposed in parallel relation and spaced apart, each of said arches being composed of companion members 1 and 2, having their horizontal portions overlapped and slidable in keepers 3 at the outer ends of said members. A pair of members, as 1, are toothed at their lower edges and engage with pinions 4, mounted upon a shaft 5, journaled in brackets 6, secured in the angles between the vertical and horizontal members of the parts 2 at one side of the machine. Upon rotating the shaft 5 by means of a crank applied thereto the members or sections 1 and 2 can be moved in or out, so as to vary the width of the machine. A sliding bolt 7 is adapted to engage with the teeth of a pinion 4 and hold the arches in an adjusted position. This bolt is formed with a lateral extension 8 to engage with a stop 9 to secure the bolt when in engagement with the pinion.

The pole or tongue comprising rearwardly-divergent bars 11 has its members secured to the sides of the frame and extended rearwardly and connected by a cross-bar 14, which supports a seat 13.

The arches are connected at their ends by upper and lower brackets 18 and 19, which extend horizontally in parallel relation and in which are journaled standards 20, provided at their lower ends with pilot-wheels 21. The upper end of each standard 20 has a head 22 loosely fitted thereto, said head being cleft to receive a lever 23, which is fulcrumed between its ends to the head, thereby admitting of the framework being adjusted vertically to vary the height of the earth-treating devices. This lever 23 has connection at one end by means of a chain 24 or like means with the frame, and its opposite end makes adjustable connection with the notched rod or bar 25, by means of which the lever and frame are held at the required position. A hand-operated latch 26 of ordinary construction is provided for each lever 23 and engages with the coöperating toothed bar 25, so as to hold the lever and the frame when adjusted.

Arms 27 are secured at their front ends to the upper end portions of the standards 20 and project rearwardly and make connection with a transverse bar 28. This bar 28 is accessible from the driver's seat 13, so as to be operated for giving proper direction to the machine when the latter is in operation. The means just described enable the driver to steer the machine to a certain degree independently of the draft. The advantage of having the heads 22 loosely mounted upon the standards is obvious when it is remembered that the levers 23 are free from lateral motion, whereas the standards are mounted so as to be turned to give proper direction to the machine. When it is required to increase or decrease the width of the implement, one of the arms 27 is disconnected from the bar 28 and the standard corresponding therewith turned to bring the pilot-wheel 21 at right angles to the line of motion, after which the arches can be lengthened or shortened by operating the shaft 5 in the manner set forth. After the machine has been adjusted to the desired width the standard is returned to a normal position and the arm 27, previously loosened, coupled with the bar 28. The bars 11, being loosely connected intermediate of their ends to the frame, move so as to adapt themselves to the variation of width of the machine when adjusting the latter.

A block 32 is provided for each side of the machine and is pivotally supported between the lower ends of the vertical portions of the arches. Each block has a standard 33 at one end of segment form at its upper extremity and provided with a series of openings 35 to receive a bolt or pin 36, by means of which the block is held in an adjusted position. The bolt or pin 36 passes through one of the series of openings 35 and through corresponding openings in the vertical members of the arches. Each block 32 is formed with an opening 34 to receive the shaft of the stalk-cutter (not shown) when in position. A disk or plate 37 is applied to or formed with the lower side of each block 32 and has a series of openings 38. The earth-treating devices are adapted to be adjustably connected with the disk or plate 37 and have a circular head or plate 39 corresponding with the plate 37, to which it is centrally secured by means of a vertical bolt 40, passing through openings in the parts 32, 37, and 39. The head 39 is adapted to turn upon the bolt 40 and is provided with openings 41, corresponding to the openings 38, and a pin or key 42 is adapted to pass through registering openings 38 and 41 to hold the head 39 in an adjusted position. The earth-treating devices may be of any of the usual varieties, according to the nature of the work in hand, and may be secured to the head 35 in any convenient and desired manner. As shown most clearly in Figs. 2 and 5, the earth-treating devices are cultivator-disks 43, which are journaled upon an axle mounted in hangers pendent from the head 39. As indicated in Figs. 6 and 7, the earth-treating devices are spring harrow-teeth 44, which are attached directly to the head 39 in any substantial manner.

As will be readily understood, the earth-treating devices are susceptible of a fourfold adjustment—vertically, laterally, angularly with respect to the line of motion of the machine, and angularly with respect to a horizontal plane—so as to adapt the earth-treating devices to the slope of the sides of rows when cultivating plants sown in hills or ridges. The vertical adjustment regulates the depth of cultivation and the lateral adjustment adapts the gangs of earth-treating devices to the distance between rows of plants, the angular adjustment with reference to the line of draft enables the earth to be thrown toward or away from the plants to a greater or less degree, and the angular adjustment with reference to a horizontal plane adapts the earth-treating devices to the pitch or slope of ridges or rows.

It is obvious that the implement may be used for a variety of purposes, according to the style of earth-treating devices applied thereto.

Having thus described the invention, what is claimed, and desired to be secured by Letters Patent, is—

1. In an agricultural implement, the combination of an arch bearing earth-treating devices at its ends and composed of corresponding parts, each part consisting of a horizontal and a vertical member, the latter having a keeper at its upper end, and said parts being placed with the horizontal members alongside each other and slidable in the said keepers, one of the horizontal members being toothed along one edge, a shaft journaled to the other member and having a pinion in mesh with the toothed member, and means for securing the parts of the arch when adjusted, substantially as set forth.

2. In an agricultural implement, the combination of front and rear arches composed of pairs of vertical members rigidly connected and having keepers at their upper ends, and pairs of horizontal members placed alongside each other and slidably mounted in the said keepers, one of the members of each pair being toothed along an edge, a shaft journaled horizontally to corresponding members of the arches, and pinions applied to the shaft and intermeshing with the said toothed members, substantially as and for the purpose set forth.

3. In an agricultural implement, a laterally-extensible arched frame comprising two pairs of companion members slidably fitted together, an adjusting mechanism supported on one member of the arched frame and engaging with the other member of said frame, and plates connecting corresponding pairs of said members rigidly together, combined with earth-treating devices carried by the respective members of said frame, and tiller-wheels mounted on the plates of the respective frame-sections, substantially as described.

4. In an agricultural implement, a laterally-extensible arched frame comprising two pairs of companion members, each pair of said members being united firmly together and slidably fitted to the other pair of companion members, and adjusting and locking mechanisms between the pairs of companion members for spreading the frame and holding the connected pairs of members firmly in their adjusted positions, combined with earth-treating devices mounted on the connected pairs of members on opposite sides of the joint between their overlapping portions to be adjustable with said members, and tiller-wheels mounted in the respective connected pairs of frame members in planes outside of the earth-treating devices thereon, substantially as described.

5. In an agricultural implement, a laterally-extensible arched frame comprising two pairs of members, each pair of which forms a yoke at one end and is arranged to have its other end overlap the corresponding parts of the other pair of members, and an adjusting and locking mechanism mounted on one pair of members and engaging with the other pair of members, combined with vertically-adjustable spindles mounted in the respective connected pairs of members to turn axially therein, tiller-wheels journaled in said spindles to partake of the vertical and axial adjustment thereof, and levers connected to said spindles and the frame-sections for effecting the vertical adjustment of the spindles and to permit the axial turning adjustment thereof, substantially as described.

6. In an agricultural implement, the combination of a sectional arched frame having its members adjustably coupled together, earth-treating devices mounted on the respective members of said frame, spindles mounted loosely in the frame members for vertical and axial adjustment therein and carrying the tiller-wheels, means for adjusting the spindles and wheels vertically, and means for turning the spindles and wheels simultaneously on vertical axes to position the wheels in the plane of adjustment of the frame-sections, substantially as described.

7. In an agricultural implement, the combination of a sectional arched frame having its members extensibly coupled together, earth-treating devices carried by the respective sections or members of said frame for adjustment laterally therewith, vertical spindles carrying the tiller-wheels and mounted loosely in the respective members of said frame for vertical and axial adjustment therein, levers connected to the frame-sections and the spindles to effect the vertical adjustment thereof and permit of a free axial adjustment, and a shiftable bar operatively connected to the spindles to adjust the latter simultaneously on their axes and change the tiller-wheels to positions at right angles to the line of draft and in the plane of the extension adjustment of the frame members, substantially as described.

8. In an agricultural implement, the combination with a sectional frame having its members connected adjustably together, and earth-treating devices mounted on the respective members of said frame, of vertical spindles carrying tiller-wheels and each mounted loosely in one member of said frame, fulcrum-heads fitted loosely to the spindles, levers each fulcrumed in one of said heads and connected with one frame-section to adjust the spindle and its tiller-wheel in a vertical direction, a locking mechanism for each lever, and a shiftable bar operatively connected with both spindles to adjust the latter on their axes, substantially as described.

9. In an agricultural implement, the combination with an extensible frame, and earth-treating devices mounted in the respective members of said frame, of vertical spindles carrying tiller-wheels and mounted in the respective frame-sections for axial adjustment therein, and a shifting bar operatively connected with both spindles to adjust the latter simultaneously on their axes and change the positions of the tiller-wheels with relation to the line of draft, substantially as described.

10. In an agricultural implement, the arched extensible frame comprising two pairs of members each of which is united at one end rigidly together and has the other end thereof arranged to overlap the corresponding end of the other pair of members, one pair of members being provided with racks, a shaft journaled on the other pair of members and geared to said racks, and a locking-bolt mounted to engage with a pinion on said shaft and the bolt itself provided with a detent device, combined with earth-treating devices mounted in the devices which connect the outer ends of the pairs of members together and said devices adjustable with the respective members of said frame, and tiller devices mounted on the respective members of said frame, substantially as described.

11. In an agricultural implement, the combination with a sectional extensible frame, and tiller-wheels mounted in the respective sections of the frame for adjustment therewith, of hangers mounted in the respective frame members for adjustment therein to angular positions with relation to the line of draft and adjustable laterally in relation to each other with the frame-sections, and heads carrying earth-treating devices and connected to the hangers for adjustment in a horizontal plane thereon, substantially as described.

12. In an agricultural implement, the combination of a sectional extensible frame having its members provided with yokes, tiller-wheel spindles mounted in said members of the frame, hangers pivotally supported in the yoke-shaped ends of the frame members and adjustable therein to different angular positions with relation to the line of the draft and said hangers also adjustable with the frame-sections laterally with respect to each other, a locking device for each pivoted hanger, heads carrying earth-treating devices and pivoted to the hangers for adjustment in horizontal planes thereon, and locking devices between the hangers and the heads, substantially as described.

13. In an agricultural implement, the combination of a sectional frame having its members coupled extensibly together and each provided with a yoke and with supporting-plates at the outer end thereof, a two-part tongue having its bars attached to said plates of the frame members, tiller-wheel spindles mounted in said plates, hangers connected to the yokes of the frame members and adjustable therewith, and earth-treating devices mounted on said hangers for adjustment therewith and with the frame members, substantially as described.

In testimony that I claim the foregoing as my own I have hereto affixed my signature in the presence of two witnesses.

CHARLES TANNER.

Witnesses:
   EDW. S. HART,
   M. C. ROBERT.